US009696119B2

(12) United States Patent
Cheatham, III et al.

(10) Patent No.: US 9,696,119 B2
(45) Date of Patent: Jul. 4, 2017

(54) CAMOUFLAGE FOR TRANSMISSION TOWERS AND LINES

(71) Applicant: Elwha LLC, Bellevue, WA (US)

(72) Inventors: Jesse R. Cheatham, III, Seattle, WA (US); Geoffrey F. Deane, Bellevue, WA (US); William Gates, Medina, WA (US); Roderick A. Hyde, Redmond, WA (US); Muriel Y. Ishikawa, Livermore, CA (US); Jordin T. Kare, Seattle, WA (US); Nathan P. Myhrvold, Medina, WA (US); Robert C. Petroski, Seattle, WA (US); Clarence T. Tegreene, Mercer Island, WA (US); David B. Tuckerman, Lafayette, CA (US); Charles Whitmer, North Bend, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 158 days.

(21) Appl. No.: 14/597,807

(22) Filed: Jan. 15, 2015

(65) Prior Publication Data

US 2016/0208994 A1    Jul. 21, 2016

(51) Int. Cl.
*F41H 3/00* (2006.01)
*F21V 33/00* (2006.01)
(Continued)

(52) U.S. Cl.
CPC ............... *F41H 3/00* (2013.01); *E04H 12/02* (2013.01); *E04H 12/04* (2013.01); *E04H 12/10* (2013.01); *E04H 12/12* (2013.01); *F21V 33/00* (2013.01); *F21Y 2113/13* (2016.08); *F21Y 2115/10* (2016.08); *H02G 7/00* (2013.01)

(58) Field of Classification Search
CPC . F41H 3/00; E04H 12/00; F21V 33/00; F21Y 2113/13; F21Y 2115/10; H02G 7/00
See application file for complete search history.

(56) References Cited

U.S. PATENT DOCUMENTS 2,292,848 A    8/1942   Robson
4,212,440 A    7/1980   Ferris
(Continued)

OTHER PUBLICATIONS

Forskningsradet, "Optimal Design and Routing of Power Lines; Ecological, Technical and Economic Perspectives", http://www.forskningsradet.no/servlet/Satellite?c=Prosjekt&cid=1232110434936&pagename=renergi/Hovedsidemal&p=1226993846917, Dec. 31, 2013, visited Jan. 16, 2015, 1 pg.
(Continued)

*Primary Examiner* — Mary Ellen Bowman

(57) ABSTRACT

The present disclosure relates to camouflaged systems and related camouflaging methods. The camouflaged systems can include at least one camouflaged object, including but not limited to transmission lines and transmission towers. One or more pluralities of lights may be disposed on or otherwise coupled to a surface of the camouflaged object. Each of the one or more pluralities of lights can be configured to emit light having a characteristic that appears like (e.g., matches, mimics, simulates, corresponds to, or otherwise blends with) an environmental condition, which can include any variety of background environmental landscapes.

40 Claims, 12 Drawing Sheets

(51) Int. Cl.
    *E04H 12/02*   (2006.01)
    *E04H 12/04*   (2006.01)
    *E04H 12/10*   (2006.01)
    *E04H 12/12*   (2006.01)
    *F21Y 115/10*   (2016.01)
    *H02G 7/00*   (2006.01)
    *F21Y 113/13*   (2016.01)

(56) References Cited

U.S. PATENT DOCUMENTS

| | | | |
|---|---|---|---|
| 4,288,974 | A | 9/1981 | Eistrat |
| 6,408,865 | B1 | 6/2002 | Bliss |
| 7,132,635 | B2 | 11/2006 | Dowling |
| 2004/0036006 | A1* | 2/2004 | Dowling .................. F41H 3/00 250/205 |
| 2008/0246679 | A1* | 10/2008 | Martek .................. H01Q 1/362 343/793 |
| 2008/0261002 | A1* | 10/2008 | Sloot .................. F41H 3/00 428/198 |
| 2013/0284512 | A1 | 10/2013 | Fulk et al. |
| 2014/0105745 | A1* | 4/2014 | Pokotylo ................ F03D 11/00 416/146 R |

OTHER PUBLICATIONS

Goulty, "Camouflage Painting of Steel Lattice Transmission Towers, With Particular Reference to England and Wales", Landscape and Urban Planning, 1987, pp. 345-354, issue 14, Elsevier Science Publishers B.V., Amsterdam, The Netherlands.
"Polarization"; Merriam-Webster Dictionary; printed on Jan. 12, 2017; pp. 1-12; located at: https://www.merriam-webster.com/dictionary/polarization.
"Specular reflection"; Wikipedia; printed on Jan. 12, 2017; pp. 1-4; located at: https://en.wikipedia.org/wiki/Specular_reflection.
"Diffuse reflection"; Wikipedia; printed on Jan. 12, 2017; pp. 1-4; located at: https://en.wikipedia.org/wiki/Diffuse_reflection.
"Camouflage"; Dictionary.com; printed on Jan. 12, 2017; pp. 1-5; located at: http://www.dictionary.com/browse/camouflage.

* cited by examiner

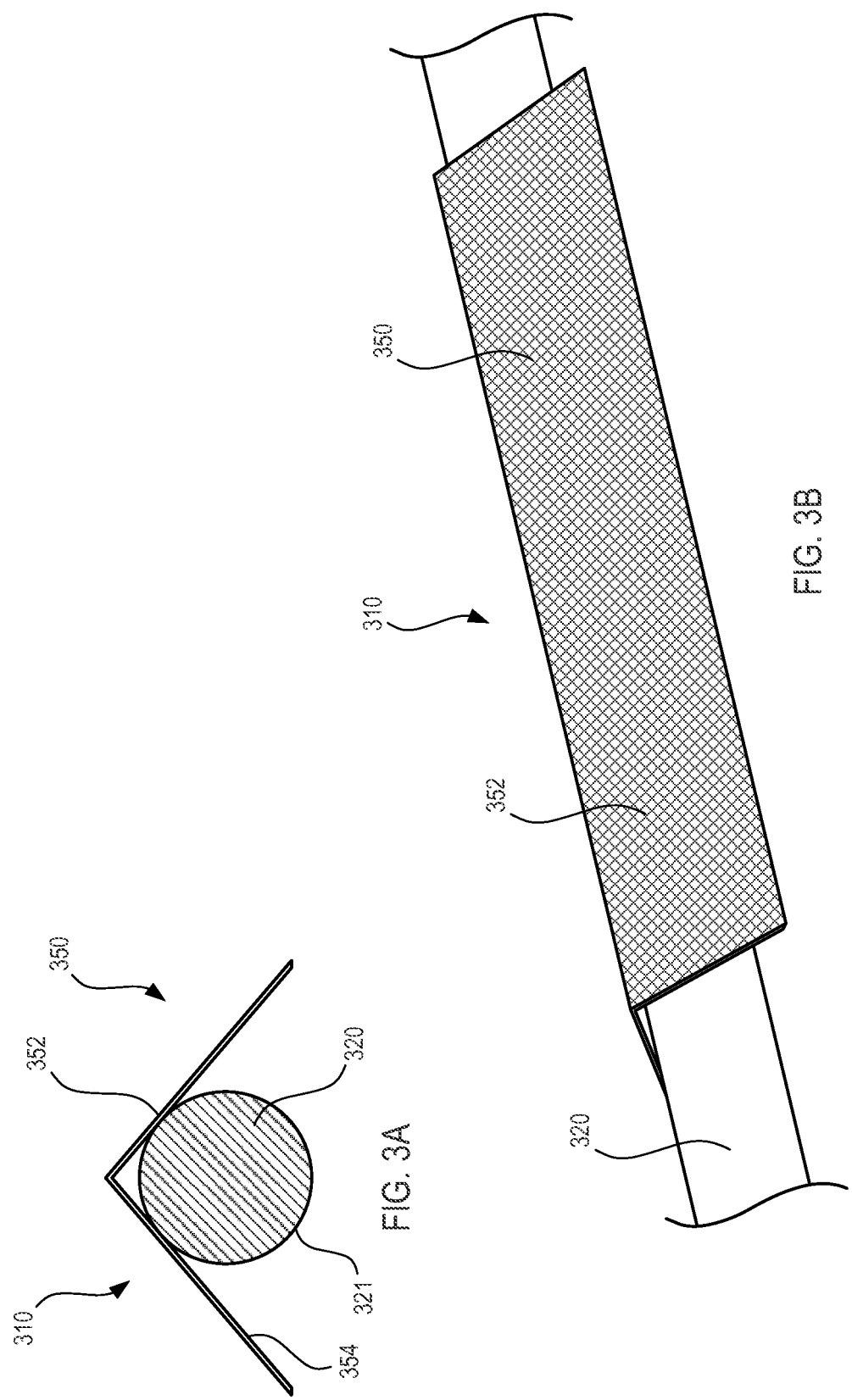

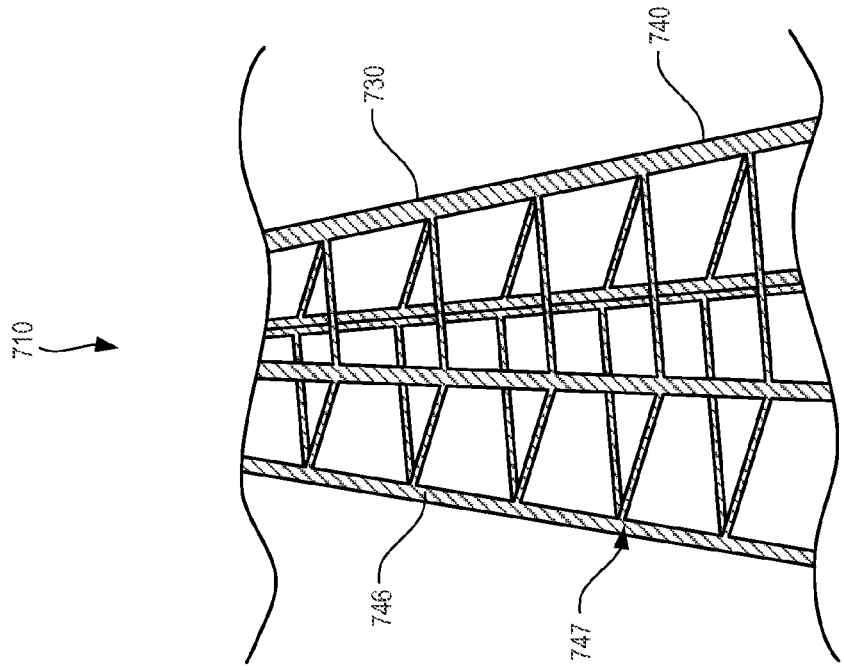
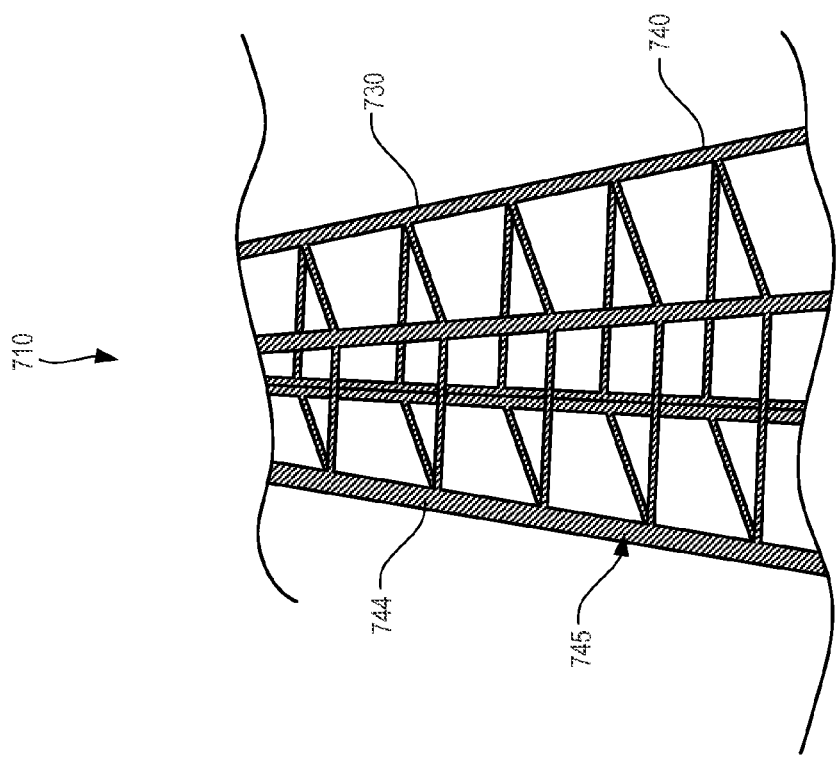

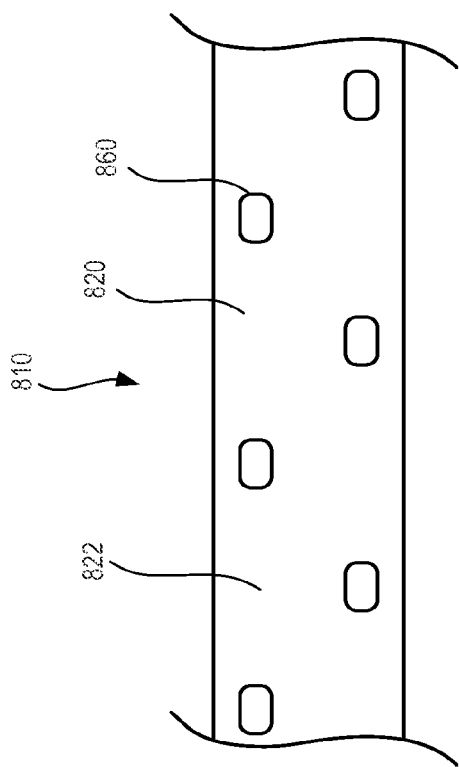
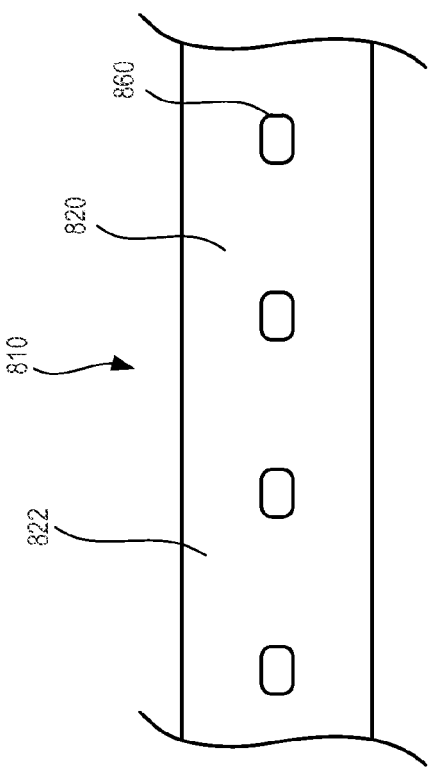
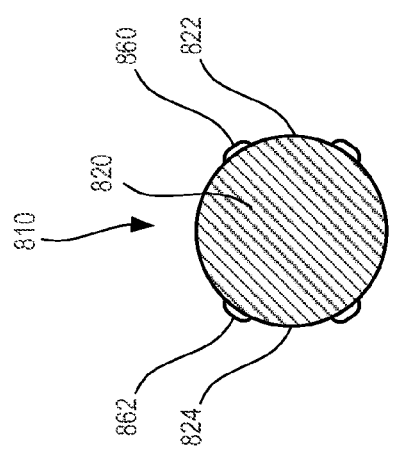
FIG. 9B
FIG. 9C
FIG. 9A

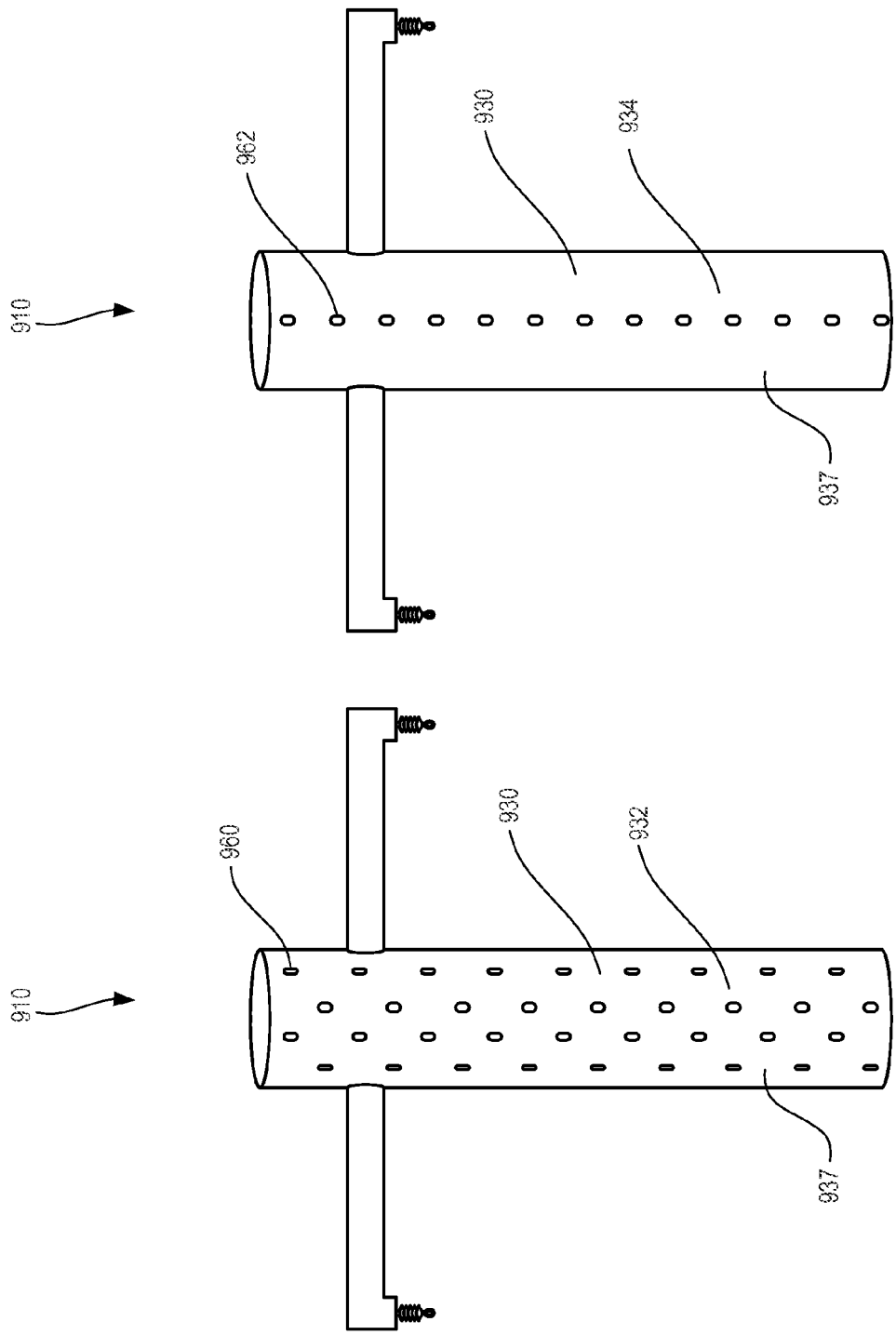

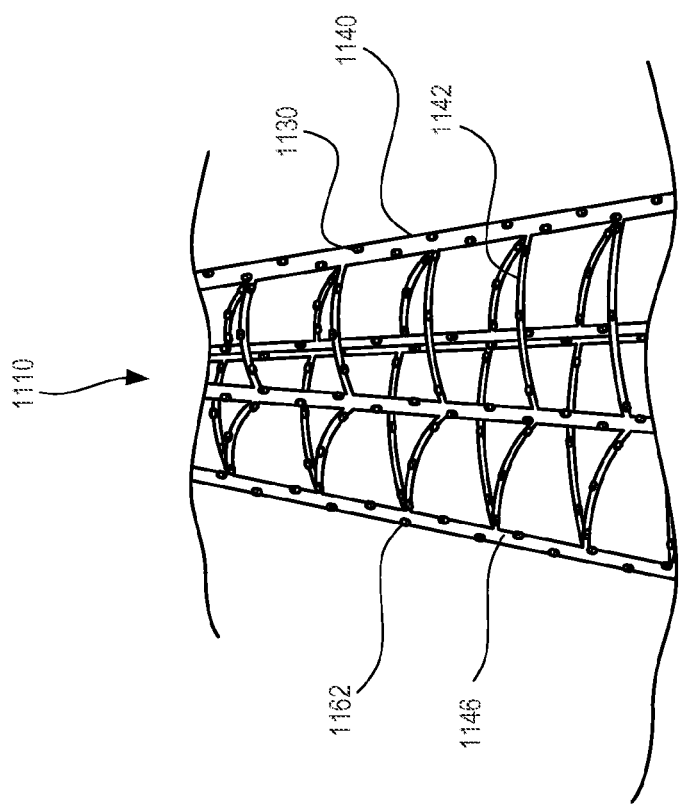
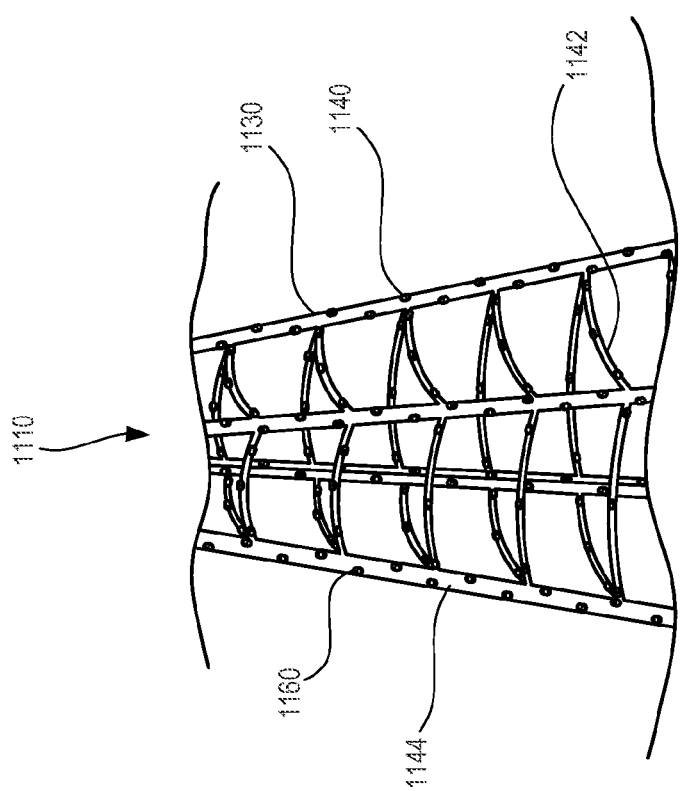

CAMOUFLAGE FOR TRANSMISSION TOWERS AND LINES

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority applications"), if any, listed below (e.g., claims earliest available priority dates for other than provisional patent applications, or claims benefits under 35 U.S.C. §119(e) for provisional patent applications, for any and all parent, grandparent, great-grandparent, etc. applications of the Priority application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority applications section of this application.

All subject matter of the Priority applications and of any and all applications related to the Priority applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This disclosure relates to camouflaged systems and related camouflaging methods. The camouflaged systems can include one or more camouflaged objects, including but not limited to transmission lines and transmission towers.

SUMMARY

The present disclosure relates to camouflaged systems and related camouflaging methods. As detailed below, the camouflaged systems can include at least one camouflaged object. Exemplary camouflaged objects include but are not limited to transmission lines and transmission towers.

One or more pluralities of lights may be disposed on or otherwise coupled to a surface of the camouflaged object. Each of the one or more pluralities of lights can be configured to emit light having a characteristic that appears like (e.g., matches, mimics, simulates, corresponds to, or otherwise blends with) an environmental condition, which can include any variety of background environmental landscapes.

Exemplary characteristics of the emitted light can include but are not limited to color and/or intensity (e.g., brightness, etc.) For example, each of the one or more pluralities of lights can be configured to emit light having a particular color and/or intensity that corresponds to a particular environmental condition.

Further, the camouflaged object can be configured such that at least two pluralities of lights are disposed thereon, each of which is configured to emit light that appears like (e.g., matches, mimics, simulates, corresponds to, or otherwise blends with) at least two different environmental conditions. For example, a first plurality of lights can be configured to emit light having a first characteristic that corresponds to a first environmental condition, and a second plurality of lights can be configured to emit light having a second characteristic that corresponds to a second environmental condition. In such instances, the appearance of the camouflaged object can be dependent upon the location of the observer. For example, the first plurality of lights can be observed from a first location, and the second plurality of lights can be observed from a second location. The ability to recognize the camouflaged object can thus be reduced, independent of the location and/or viewpoint of the observer and independent of changes in the environment.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 3A-3B depict a camouflaged object comprising a reflector, according to another embodiment of the present disclosure.

FIGS. 8A-8B depict a camouflaged object comprising a transmission tower, according to another embodiment of the present disclosure.

FIGS. 9A-9C depict a camouflaged object comprising a transmission line, according to another embodiment of the present disclosure.

FIGS. 10A-10B depict a camouflaged object comprising a transmission tower, according to another embodiment of the present disclosure.

FIGS. 12A-12B depict a camouflaged object comprising a transmission tower, according to another embodiment of the present disclosure.

DETAILED DESCRIPTION

Figure 1:
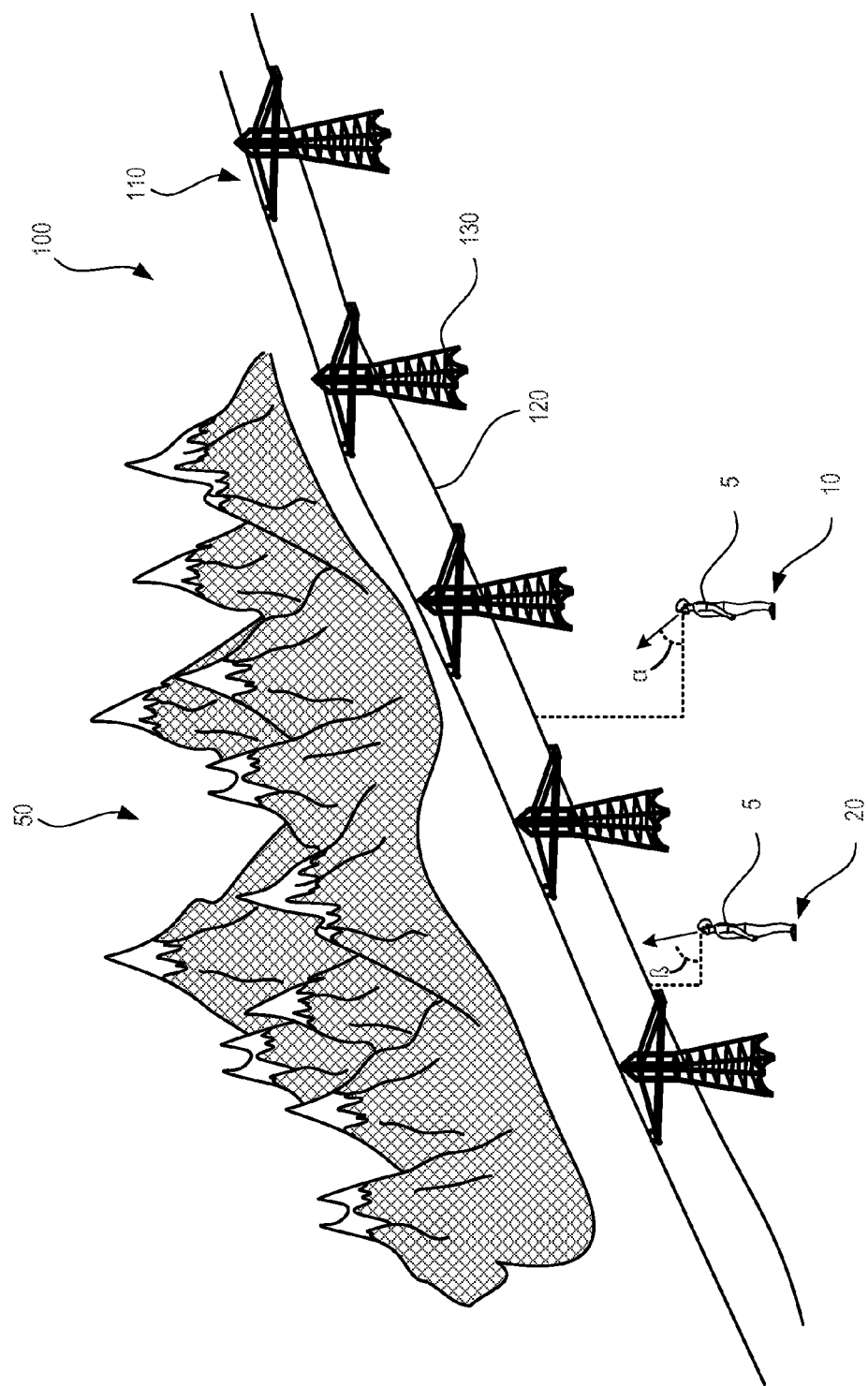
FIG. 1 depicts a camouflaged system, according to an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

The present disclosure relates to camouflaged systems and related camouflaging methods. As detailed below, the camouflaged systems can include at least one camouflaged object. Exemplary camouflaged objects include but are not limited to transmission lines and transmission towers.

One or more pluralities of lights may be disposed on or otherwise coupled to a surface of the camouflaged object. Each of the one or more pluralities of lights can be configured to emit light having a characteristic that appears like (e.g., matches, mimics, simulates, corresponds to, or otherwise blends with) an environmental condition, which can include any variety of background environmental landscapes.

Exemplary characteristics of the emitted light can include but are not limited to color and/or intensity (e.g., brightness, etc.) For example, each of the one or more pluralities of lights can be configured to emit light having a particular color and/or intensity that corresponds to a particular environmental condition.

Further, the camouflaged object can be configured such that at least two pluralities of lights are disposed thereon, each of which is configured to emit light that appears like (e.g., matches, mimics, simulates, corresponds to, or otherwise blends with) at least two different environmental conditions. For example, a first plurality of lights can be configured to emit light having a first characteristic that corresponds to a first environmental condition, and a second plurality of lights can be configured to emit light having a second characteristic that corresponds to a second environmental condition. In such instances, the appearance of the camouflaged object can be dependent upon the location of the observer. For example, the first plurality of lights can be observed from a first location, and the second plurality of lights can be observed from a second location. The ability to recognize the camouflaged object can thus be reduced, independent of the location and/or viewpoint of the observer and independent of changes in the environment.

FIG. 1 depicts a camouflaged transmission system 100, according to an embodiment of the disclosure. As shown in FIG. 1, the camouflaged transmission system 100 comprises at least one camouflaged object 110. The camouflaged object 110 can comprise various structures, including but not limited to a transmission line 120 and/or a transmission tower 130.

A transmission line 120 refers to any line that is configured to carry, transfer, or otherwise transmit a current or signal from one location to another. For example, in some embodiments, a transmission line 120 can be configured to carry an electrical current or electrical signal. In other embodiments, a transmission line 120 can be configured to carry light.

Various types of transmission lines 120 can be camouflaged according to the principles disclosed herein. For example, in some embodiments, the transmission line 120 comprises a wire, fiber, or cable. The transmission line 120 can also comprise various materials, including but not limited to metals (e.g., aluminum, steel, copper, gold, etc.), composite materials, plastics (e.g., plastic optical fiber), and glass (e.g., glass optical fiber). Exemplary transmission lines 120 include but are not limited to power lines, contact lines (e.g., contact lines for railways), and communications lines.

A transmission tower 130 refers to any structure that is configured to aid in carrying, transferring, or otherwise transmitting a current or signal from one location to another. For example, in some embodiments, a transmission tower 130 can support a transmission line 120. In other embodiments, a transmission tower 130 can be used in sending wireless signals. The transmission tower 130 can include various materials, including but not limited to metals (e.g., steel, aluminum, etc.), composite materials, wood, and concrete.

Various types of transmission towers 130 can be camouflaged according to the principles disclosed herein. For example, in some embodiments, the transmission tower 130 includes a pylon or other pillar-like structure. The transmission tower 130 can further include one or more cross-arms. The cross-arms can be coupled to the transmission line 120. In some embodiments, the transmission tower 130 comprises a lattice structure comprising a plurality of struts. The struts can be substantially linear (e.g., straight) or non-linear (e.g., curved). Exemplary transmission towers 130 include but are not limited to power line transmission towers, telephone transmission towers (e.g., telephone line towers, cell phone towers, etc.), railway transmission towers, internet transmission towers, and other types of data transmission towers.

The camouflaged object 110 can also comprise other objects and/or structures if desired. For example, the camouflaged object 110 can comprise various post or pole type structures, including but not limited to posts or poles used to support lights, traffic signals, signs, antennas, wind mills, etc. Non-post or non-pole type structures can also be camouflaged according to the principles disclosed herein. It will thus be appreciated that the camouflaging principles disclosed herein are not limited to any particular object and/or structure.

With continued reference to FIG. 1, in some embodiments, one or more surfaces of the camouflaged object 110 can be configured to reflect light such that the surface appears like (e.g., matches, mimics, simulates, corresponds to, or otherwise blends with) an environmental condition 50. In other words, one or more surfaces of the camouflaged object 110 can be configured to have a reflectivity that corresponds to a particular environmental condition 50. Configuring the reflectivity to correspond to an environmental condition 50 can reduce the ability of an observer 5 to recognize the camouflaged object 110 or distinguish the camouflaged object 110 from the environmental condition 50.

In certain embodiments, the environmental condition 50 can comprise the camouflaged object's 110 surroundings, or the surrounding environmental landscape. The surrounding environmental landscape can also be referred to as a background environmental landscape. Exemplary environmental landscapes include but are not limited to forested landscapes, wooded landscapes, mountainous landscapes, coastal landscapes, rocky landscapes, snowy landscapes, hilly landscapes, desert landscapes, plain landscapes, agricultural landscapes, sky landscapes, water landscapes, grassy landscapes, industrial landscapes (e.g., industrial buildings, refineries, etc.), commercial landscapes (e.g., commercial buildings, office buildings, etc.), and residential landscapes (e.g., residential homes, apartments buildings, etc.).

Various methods can be used to configure or otherwise impart the one or more surfaces of the camouflaged object 110 with a desired reflectivity. For example, in some embodiments, data or information about an environmental condition can be collected, obtained, and/or received. The data or information can include the location of the camouflaged object 110 and/or the one or more surfaces thereof, or the location where the camouflaged object 110 is to be employed. The data or information can further include the characteristics of the environmental condition(s) at and/or near the location of the camouflaged object 110 and/or the one or more surfaces thereof, including the characteristics of the environmental condition(s) that are observed when viewing the camouflaged object 110 and/or the one or more surfaces thereof from one or more observation locations or viewpoints.

A particular reflectivity can then be imparted to the one or more surfaces of the camouflaged object 110 by, for example, painting the one or more surfaces, coating the one or more surfaces, imparting a texture to the one or more surfaces, or combinations thereof. The resulting paint layer, coating layer, texture, and/or combination thereof can exhibit a reflectivity having characteristics that appear like (e.g., match, mimic, simulate, correspond to, or otherwise blend with) the data or information received about the environmental condition.

The reflectivity can be imparted to the one or more surfaces of the camouflaged object 110 at various times. For example, in some embodiments, the reflectivity is imparted during the manufacturing process of the camouflaged object 110. In other embodiments, the reflectivity is imparted after manufacturing the camouflaged object 110, but prior to delivery and/or installation of the camouflaged object 110 at the location where it is to be employed. In yet other embodiments, the reflectivity can be imparted during installation at the desired location. In yet other embodiments, the reflectivity is imparted after installation. Further, in some embodiments, robots can be used to impart the reflectivity to the one or more surfaces. For example, line walking robots can be used in embodiments wherein the camouflaged object 110 comprises a transmission line 120.

The characteristics of the reflectivity (i.e., the reflective properties) exhibited by the one or more surfaces can also be varied as desired to achieve any particular camouflaging property. Such characteristics of the reflectivity include but are not limited to color, reflective intensity (e.g., brightness), magnitude of reflection, polarization, reflective direction, angle of reflection, diffuse reflection, specular reflection, and combinations thereof. By varying the reflective properties, the one or more surfaces can be configured to correspond to any variety of background environmental conditions.

With continued reference to FIG. 1, in certain embodiments, the camouflaged object 110 can be configured such that at least two surfaces appear like (e.g., match, mimic, simulate, correspond to, or otherwise blend with) at least two different environmental conditions. For example, the camouflaged object 110 can comprise a first surface having a first reflectivity that corresponds to a first environmental condition 50, and a second surface having a second reflectivity that corresponds to a second environmental condition 50. In such embodiments, the reflectivity or appearance of the camouflaged object 110 can be dependent upon the location of the observer 5. For example, the first reflectivity can be observed from a first location 10 and the second reflectivity can be observed from a second location 20. The ability to recognize the camouflaged object 110 can thus be reduced when viewed from a plurality of locations (e.g., 10, 20) despite the presence of multiple and/or varied environmental conditions 50.

In some of such embodiments, the first environmental condition 50 can comprise the camouflaged object's 110 surroundings (e.g., a first background environmental landscape) that are observed when the camouflaged object 110 is viewed from a first location 10, and the second environmental condition 50 can comprise the camouflaged object's 110 surroundings (e.g., a second background environmental landscape) that are observed when the camouflaged object 110 is viewed from a second location 20. With specific reference to FIG. 1, for example, a first surface of the camouflaged object 110 can have a first reflectivity that corresponds to a first environmental condition 50 comprising a mountainous landscape, and a second surface of the camouflaged object 110 can have a second reflectivity that corresponds to a second environmental condition 50 comprising a sky landscape. When the observer 5 views the camouflaged object 110 from the first location 10 (e.g., a location at a distance that is away from the camouflaged object 110), the first surface may be the only substantially viewable surface such that the ability of the observer 5 to recognize the camouflaged object 110 and/or distinguish the camouflaged object 110 from the background mountainous landscape may be reduced. Further, when the observer 5 views the camouflaged object 110 from the second location 20 (e.g., a location closer to or beneath the camouflaged object 110), the second surface may be the only substantially viewable surface such that the ability of the observer 5 to recognize the camouflaged object 110 and/or distinguish the camouflaged object 110 from the background sky landscape may also be reduced.

As further shown in FIG. 1, the one or more surfaces of the camouflaged object 110 can be configured to correspond to different environmental conditions 50 depending upon the direction and/or angle at which the camouflaged object 110 is viewed. For example, the angular measurement between the first location 10 and the camouflaged object 110 can comprise a first angle $\alpha$, which can also be described as a first azimuth, and the angular measurement between the second location 20 and the camouflaged object 110 can comprise a second angle $\beta$, which can be described as a second azimuth. When viewing the camouflaged object 110 from the first angle $\alpha$, the first surface may be the only substantially viewable surface such that the ability of the observer 5 to recognize the camouflaged object 110 and/or distinguish the camouflaged object 110 from the first environmental landscape may be reduced. Similarly, when viewing the camouflaged object 110 from the second angle $\beta$, the second surface may be the only substantially viewable surface such that the ability of the observer 5 to recognize the camouflaged object 110 and/or distinguish the camouflaged object 110 from the second environmental landscape may be reduced.

As further detailed below, in some embodiments, one or more surfaces of the camouflaged object 110 can extend along a direction (e.g., a longitudinal direction) and can further include one or more additional reflectivities that correspond to one or more additional environmental conditions. In such embodiments, the reflectivities of the first surface can change along the first direction so as to correspond to changes between the environmental conditions. For example, a first portion of a first surface can have a first reflectivity that corresponds to a first environmental condition, and a second portion of the first surface can have a second reflectivity that corresponds to a second environmental condition.

Figure 2B:
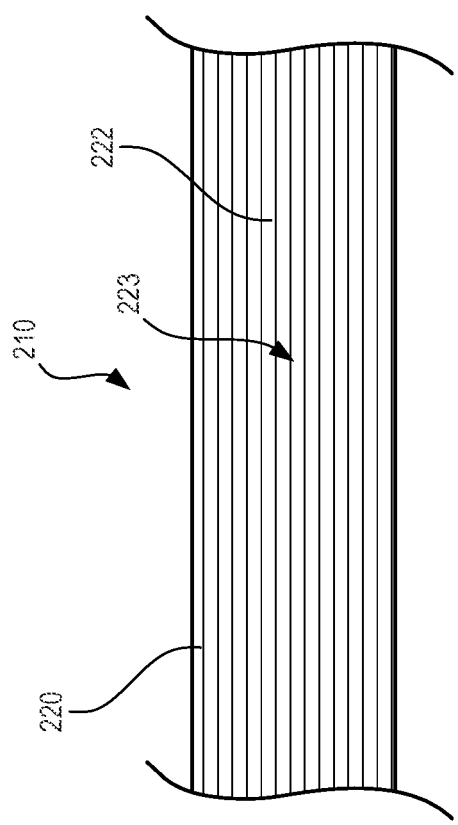
FIGS. 2A-2C depict a camouflaged object comprising a transmission line, according to another embodiment of the present disclosure.
Figure 2C:
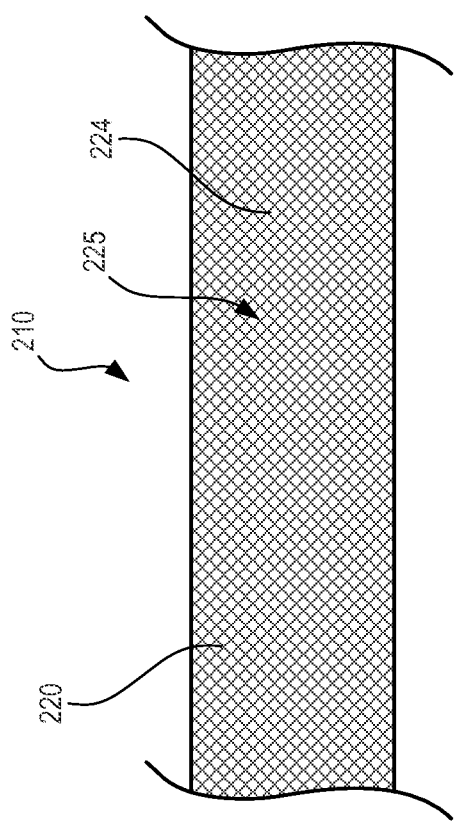
Figure 2A:
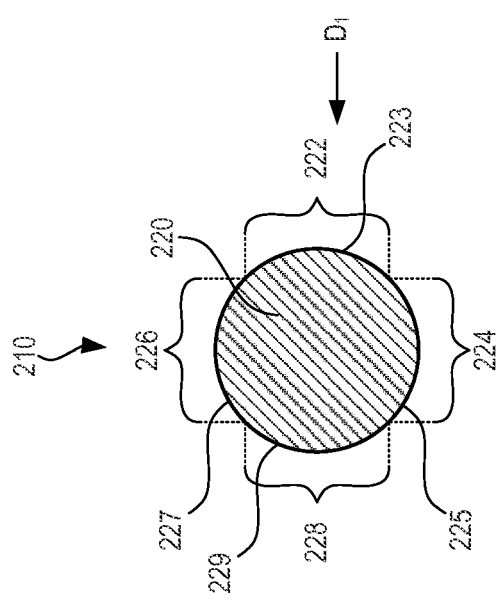

FIGS. 2A-2C depict a camouflaged object 210 comprising a transmission line 220. As shown in FIGS. 2A-2C, the transmission line 220 can comprise a plurality of surfaces (or surface regions) 222, 224, 226, 228, each of which can be configured to exhibit a particular reflectivity 223, 225, 227, 229. For example, the transmission line 220 in the illustrated embodiment comprises a first surface 222 having a first reflectivity 223, a second surface 224 having a second reflectivity 225, a third surface 226 having a third reflectivity 227, and a fourth surface 228 having a fourth reflectivity 229. The transmission line 220 can also be configured with more or fewer surfaces (or surface regions) having particular reflectivities as desired.

As previously discussed, the reflectivity 223, 225, 227, 229 of each of the surfaces (or surface regions) 222, 224, 226, 228 can be configured to correspond to a particular environmental condition. For example, the first reflectivity 223 can correspond to a first environmental condition, the second reflectivity 225 can correspond to a second environmental condition, the third reflectivity 227 can correspond to a third environmental condition, and the fourth reflectivity 229 can correspond to a fourth environmental condition. In such embodiments, the transmission line 220 can appear different when viewed from different viewpoints, observation locations, angles, and directions, etc. For example, as shown in FIG. 2B, when an observer views the transmission line 220 from the direction of $D_1$, the first surface 222 having the first reflectivity 223 may be the only substantially viewable surface. Analogously, when an observer views the transmission line 220 from the direction of $D_2$, as shown in FIG. 2C, the second surface 224 having the second reflectivity 225 may be the only substantially viewable surface.

As can be appreciated, any variation of the above-identified methods of imparting reflectivity can be applied to each surface (or surface region) 222, 224, 226, 228 of the transmission line 220. For example, the first surface 222 can comprise at least one of a paint layer, a coating, and a texture having the first reflectivity 223. Analogously, the second, third, and fourth surfaces 224, 226, 228 can each comprise at least one of a paint layer, a coating, and a texture having the second, third, and fourth reflectivities 225, 227, 229, respectively. For example, in certain embodiments, the first surface 222 comprises a first paint layer having the first reflectivity 223, and the second surface 224 comprises a second paint layer having the second reflectivity 225. In other embodiments, the first surface 222 comprises a first coating having the first reflectivity 223, and the second surface 224 comprises a second coating having the second reflectivity 225. In yet other embodiments, the first surface 222 comprises a first texture having the first reflectivity 223, and the second surface 224 comprises a second texture having the second reflectivity 225.

Combinations of the above-identified methods of imparting reflectivity can also be applied to the surfaces (or surface regions) 222, 224, 226, 228. For example, in certain of such embodiments, the first surface 222 can comprise a paint layer having the first reflectivity 223, and the second surface 224 can comprise a coating having the second reflectivity 225. In other embodiments, the first surface 222 can comprise a paint layer having the first reflectivity 223, and the second surface 224 can comprise a texture having the second reflectivity 225. In yet other embodiments, the first surface 222 can comprise a coating having the first reflectivity 223, and the second surface 224 can comprise a texture having the second reflectivity 225.

In further embodiments, one or more of the surfaces (or surface regions) 222, 224, 226, 228 can exhibit a reflectivity 223, 225, 227, 229 that comprises the default appearance of the surface 222, 224, 226, 228. For example, the surface (or surface region) 222, 224, 226, 228 can exhibit a reflectivity 223, 225, 227, 229 that is imparted during the normal course of manufacturing. In such embodiments, the surface (or surface region) 222, 224, 226, 228 need not be further painted, coated, or imparted with additional texture after the manufacturing process.

As can be appreciated, the characteristics of the first, second, third, and/or fourth reflectivities 223, 225, 227, 229 can be configured to correspond to any particular environmental condition. Such characteristics include but are not limited to color, reflective intensity, (e.g., brightness), magnitude of reflection, polarization, reflective direction, angle of reflection, diffuse reflection, specular reflection, and combinations thereof. The characteristics of the reflectivities 223, 225, 227, 229 can also be different from one another. For example, in certain embodiments, the first reflectivity 223 comprises a first color and the second reflectivity 225 comprises a second color. In further embodiments, the first reflectivity 223 comprises a first reflective intensity and the second reflectivity 225 comprises a second reflective intensity. In yet further embodiments, the first reflectivity 223 comprises a first magnitude of reflection, and the second reflectivity 225 comprises a second magnitude of reflection. In other embodiments, the first reflectivity 223 comprises a first polarization, and the second reflectivity 225 comprises a second polarization. In still other embodiments, the first reflectivity 223 comprises a first reflective direction, and the second reflectivity 225 comprises a second reflective direction. In still further embodiments, the first reflectivity 223 comprises a first angle of reflection and the second reflectivity 225 comprises a second angle of reflection. In other embodiments, the first reflectivity 223 comprises a first diffuse reflection, and the second reflectivity 225 comprises a second diffuse direction. In yet other embodiments, the first reflectivity 223 comprises a first specular reflection, and the second reflectivity 225 comprises a second specular reflection. Combinations of the above-mentioned characteristics are also contemplated.

In certain embodiments, one or more surfaces 222, 224, 226, 228 can also be configured to enhance visualization of the camouflaged object 210. For example, a surface or surface region 222, 224, 226, 228 (e.g., a top surface or surface region) can be imparted with a reflectivity 223, 225, 227, 229 that is easily seen or otherwise recognizable by a person, e.g., such as a pilot of an airplane, helicopter, para glider, hang glider, or other form of aircraft. A surface or surface region 222, 224, 226, 228 (e.g., a top surface or surface region) can also be imparted with a reflectivity 223, 225, 227, 229 that is easily seen or otherwise recognizable by animals such as birds.

It will also be appreciated that the surfaces (or surfaces regions) 222, 224, 226, 228 can be defined in various ways. For example, a surface or surface region 222, 224, 226, 228 can extend around as much or as little of the camouflaged object 210 as desired. The spatial relationship of the reflective surfaces 222, 224, 226, 228 can also be varied as desired. For example, with specific reference to FIG. 2A, in some embodiments, a first surface (or surface region) 222 can comprise a side surface of the transmission line 220, and a second surface (or surface region) 224 can comprise a bottom surface of the transmission line 220. In other embodiments, a first surface 222 can comprise the top surface of the transmission line 220, and a second surface 224 can comprise the bottom surface of the transmission line 220. In yet other embodiments, a first surface 222 can comprise one surface (e.g., a first side surface) of the transmission line 220, and a second surface 224 can comprise an opposite surface (e.g., a second side surface) of the transmission line 220. The first surface (or surface region) 222 of the transmission line 220 can also be described as comprising a first azimuthal region, and the second surface (or surface region) 224 of the transmission line 220 can be described as comprising a second azimuthal region.

FIGS. 3A-3B depict a camouflaged object 310 comprising a reflector 350, according to another embodiment of the disclosure. As shown in FIGS. 3A-3B, one or more reflectors 350 can be disposed on or otherwise coupled to the camouflaged object 310. For example, as shown in the illustrated embodiment, a reflector 350 can be coupled to a transmission line 320. In other embodiments, one or more reflectors 350 can be coupled to a transmission tower or another camouflaged object or structure.

Various types of reflectors 350 can be used. For example, in the illustrated embodiment, the reflector 350 comprises an inverted v-shaped reflector. Other types (e.g., shapes and/or sizes) of reflectors 350 can also be used as desired.

The one or more reflectors 350 can be configured to impart one or more reflective characteristics to the camouflaged object 310. For example, in some embodiments, at least one reflective surface that is observed when viewing the camouflaged object 310 can comprise a surface 352 of the reflector 350. In such embodiments, at least one surface of the camouflaged object 310 can be described as being disposed on the reflector 350.

As can be appreciated, the reflector 350 can be configured to reflect an image of an environmental condition (e.g., the surrounding environmental landscape). For example, a first surface 352 of the reflector 350 can be configured to reflect the sky or an image thereof. Other background environmental landscapes can also be reflected by the reflector 350. Further, in some embodiments, a second surface 354 of the reflector 350 can be painted or otherwise coated to correspond to a second environmental condition. For example, in the illustrated embodiment, a bottom surface 354 of the reflector 350 can be configured to correspond to a sky landscape such that the reflector 350 is not readily apparent when being viewed from a location that is substantially beneath the camouflaged object 310. In some of such embodiments, a surface 321 of the camouflaged object 310 can also be configured to correspond to the second environmental condition (e.g., sky landscape), thereby reducing the ability of an observer to recognize and/or distinguish both the surface 321 of the camouflaged object 310 and the reflector 350.

Figure 4:
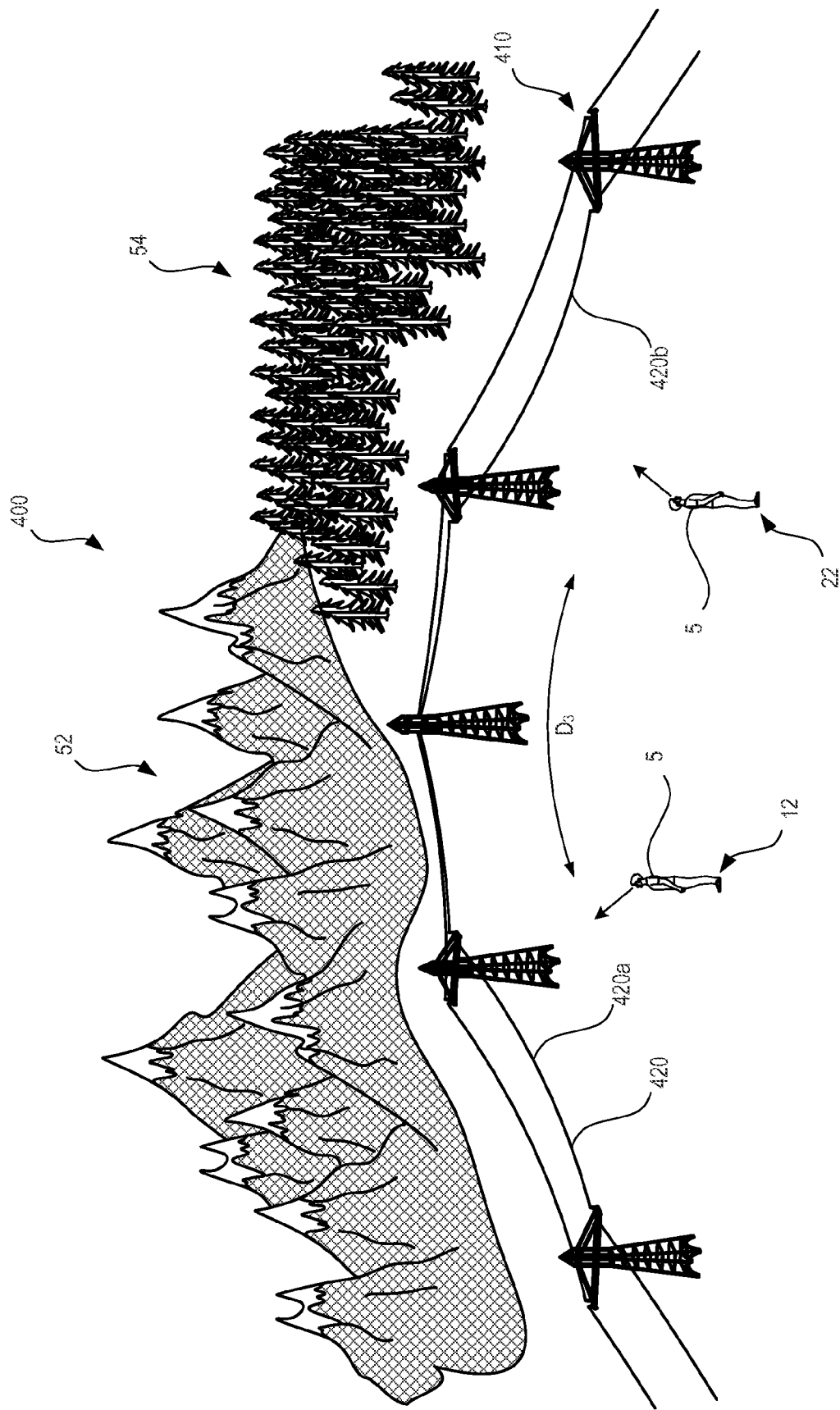
FIG. 4 depicts a camouflaged system, according to another embodiment of the present disclosure.

FIG. 4 depicts a camouflaged transmission system 400, according to another embodiment of the disclosure. As shown in FIG. 4, in some embodiments, the camouflaged object 410 comprises a transmission line 420 that extends along a first direction $D_3$ (e.g., a longitudinal direction of the transmission line 420). As the transmission line 420 extends along the first direction $D_3$, the reflectivity or reflective properties of the transmission line 420 can change to correspond to changes in one or more environmental conditions. For example, a first portion of one or more surfaces of the transmission line 420 can have a first reflectivity that corresponds to a first environmental condition 52, and a second portion of the one or more surfaces of the transmission line 420 can have a second reflectivity that corresponds to a second environmental condition 54.

With specific reference to FIG. 4, for example, a first portion 420a of one or more surfaces of the transmission line 420 can have a first reflectivity that corresponds to a first environmental condition 52 (e.g., a mountainous landscape), and a second portion 420b of one or more surfaces of the transmission line 420 can have a second reflectivity that corresponds to a second environmental condition 54 (e.g., a forested landscape). In such embodiments, the transmission line 420 can appear different when an observer 5 views the transmission line 420 from a first location 12 and a second location 22. For example, a first portion 420a of the transmission line 420 can appear like a mountainous landscape, and a second portion 420b of the transmission line 420 can appear like a forested landscape, thereby reducing the ability of the observer 5 to recognize the camouflaged object 410 from various observation locations, independent of changes in the environment. As can be appreciated, the transmission line 420 can also appear different when an observer 5 views the transmission line 420 from one location, but from different directions and/or angles (e.g., if the observer 5 at the first location 12 turns towards the second environmental condition 54).

Figure 5:
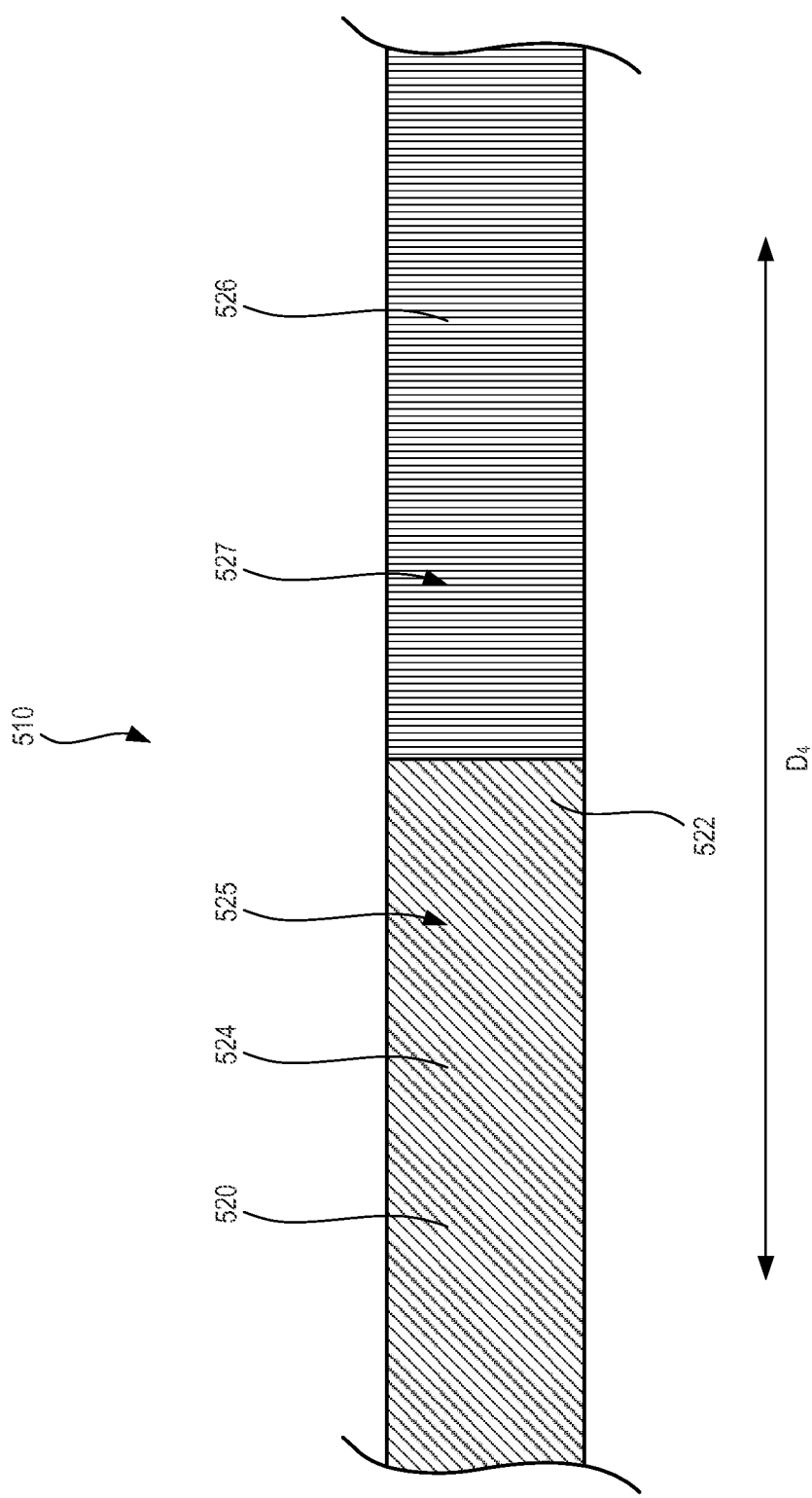
FIG. 5 depicts a camouflaged object comprising a transmission line, according to another embodiment of the present disclosure.

FIG. 5 depicts a camouflaged object 510 comprising a transmission line 520 having a surface 522 that extends along a first direction $D_4$ (e.g., a longitudinal direction). As shown in FIG. 5, the reflectivity 525, 527 varies as the transmission line 520 extends in the first direction $D_4$. For example, a first portion 524 of the surface 522 has a first reflectivity 525, and a second portion 526 of the surface 522 has a second reflectivity 527. As discussed above with respect to FIG. 4, the first reflectivity 525 can correspond to a first environmental condition, and the second reflectivity 527 can correspond to a second environmental condition.

Figure 6:
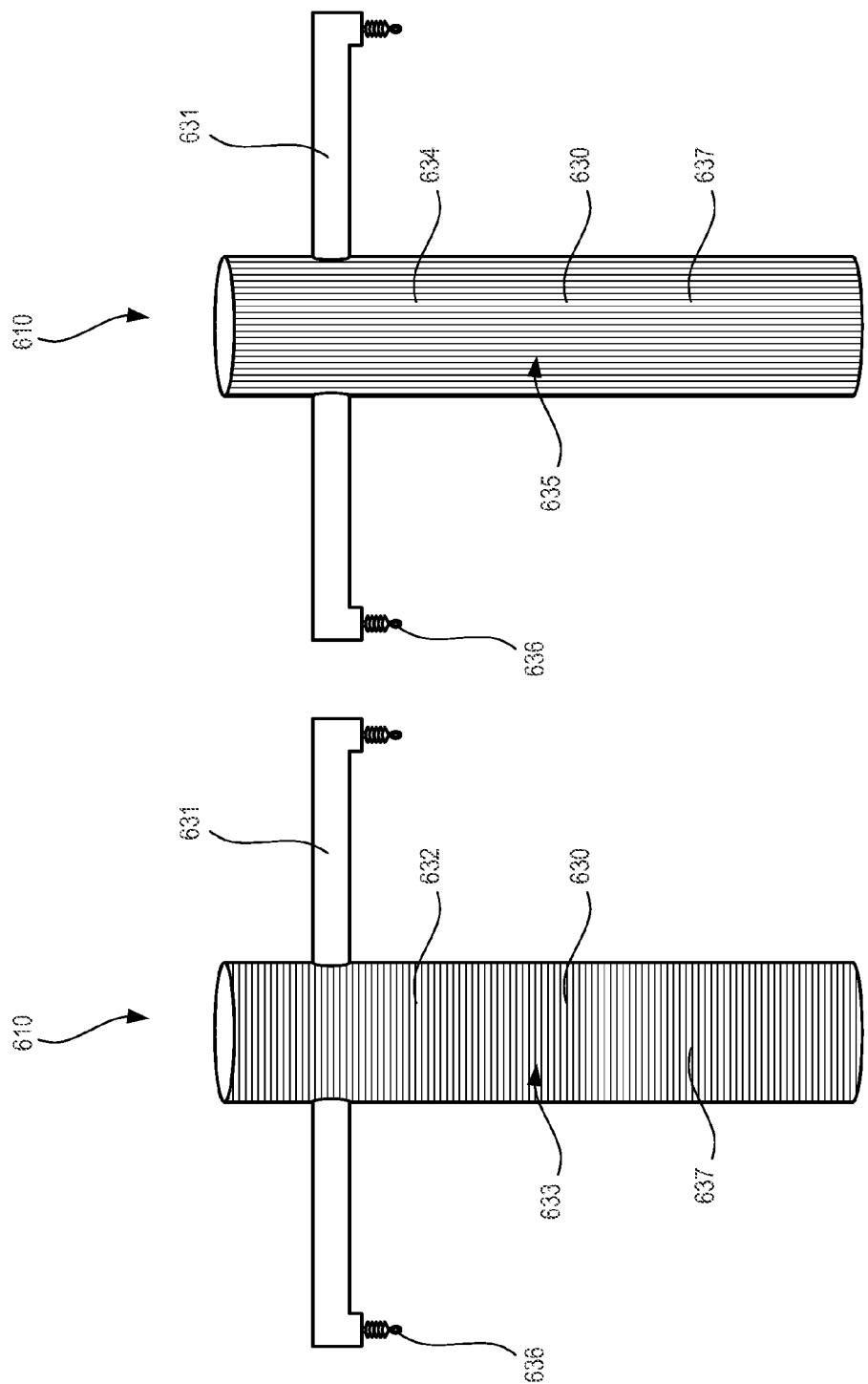
FIGS. 6A-6B depict a camouflaged object comprising a transmission tower, according to another embodiment of the present disclosure.

FIGS. 6A-6B depict a camouflaged object 610 comprising a transmission tower 630. As shown in FIGS. 6A-6B, the transmission tower 630 can comprise one or more surfaces 632, 634 that are configured to have a reflectivity 633, 635 that corresponds to a particular environmental condition. For example, in the illustrated embodiment, the transmission tower 630 comprises a first surface 632 having a first reflectivity 633 that can correspond to a first environmental condition, and a second surface 634 having a second reflectivity 635 that can correspond to a second environmental condition.

In some embodiments, the first surface 632 is disposed on a first side of the transmission tower 630 (as shown in FIG. 6A), and the second surface 634 is disposed on a second side of the transmission tower 630 (as shown in FIG. 6B). Further, the first and second sides are disposed on opposite sides of the transmission tower 630. For example, FIG. 6B depicts the transmission tower 630 of FIG. 6A rotated 180 degrees, and vice versa. The first and second surfaces 632, 634 can also be disposed on the transmission tower 630 in any other manner as desired, e.g., a bottom surface and a top surface.

As further shown in FIGS. 6A-6B, in some embodiments, the transmission tower 630 comprises a pylon or pillar-like structure 637. If desired, the transmission tower 630 can further comprise one or more cross-arms 631, which can extend outwardly from the transmission tower 630. The cross-arms 631 can include coupling members 636 and can be configured to couple to one or more transmission lines. In some of such embodiments, the cross-arms 631 can also comprise one or more surfaces that are configured to correspond to an environmental condition, analogous to the first and second surfaces 632, 634 previously discussed.

Figure 7:
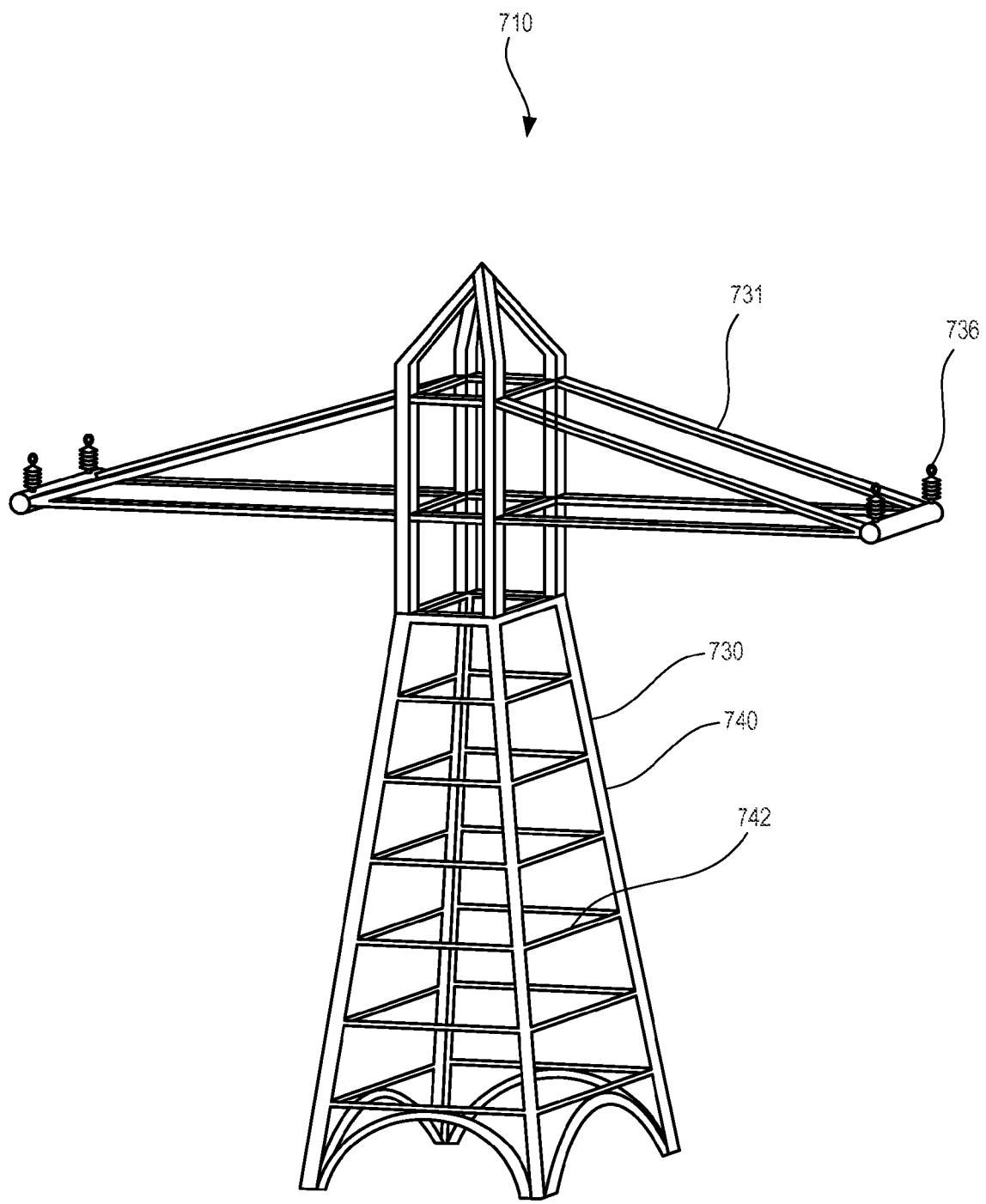
FIG. 7 depicts a camouflaged object comprising a transmission tower, according to another embodiment of the present disclosure.

FIGS. 7 and 8A-8B depict a camouflaged object 710 comprising a transmission tower 730, according to another embodiment of the disclosure. In the illustrated embodiment, the transmission tower 730 comprises a lattice structure 740. The lattice structure 740 comprises a plurality of struts 742, which can be substantially linear (as shown in the illustrated embodiment), or non-linear (e.g., curved). The transmission tower 730 further comprises one or more cross-arms 731, which can extend outwardly from the transmission tower 730 and can include one or more coupling members 736 for coupling one or more transmission lines. As previously mentioned, wireless transmission towers 730 can also be used.

It will also be appreciated that any surface (e.g., any viewable surface) of the transmission tower 730 can be camouflaged according to the principles disclosed herein. With specific reference to FIGS. 8A-8B, for example, the transmission tower 730 can comprise a first surface 744 having a first reflectivity 745 that corresponds to a first environmental condition, and a second surface 746 having a second reflectivity 747 that corresponds to a second environmental condition. The first surface 744 can be disposed on a first side of the transmission tower 730, and the second surface 746 can be disposed on a second side of the transmission tower 730. In certain embodiments, the first and second surfaces 744, 746 are disposed on opposite sides of the transmission tower 730 (as shown in FIGS. 8A-8B, which represent views of the transmission tower 730 rotated 180 degrees from one another). In other embodiments, the first and second surfaces 744, 746 can be disposed on adjacent sides of the transmission tower 730.

With further reference to FIGS. 8A-8B, when viewed from a first location, as shown in FIG. 8A, the first surface 744 having a first reflectivity 745 may be the only substantially viewable surface of the transmission tower 730. Analogously, when viewed from a second location, as shown in FIG. 8B, the second surface 746 having a second reflectivity 747 may be the only substantially viewable surface of the transmission tower 730.

FIGS. 9A-9C depict a camouflaged object 810, according to another embodiment of the disclosure. As shown in FIGS. 9A-9C, in some embodiments, camouflaging properties can be imparted through one or more pluralities of lights 860, 862, which can be disposed on or otherwise coupled to a surface 822, 824 of the camouflaged object 810. When operating and emitting light, each of the one or more pluralities of lights 860, 862 can reduce the ability of an observer to distinguish the camouflaged object 810 from an environmental condition.

As can be appreciated, the light emitted from the one or more pluralities of lights 860, 862 can be in many ways analogous to the surface reflectivities previously disclosed. For example, each of the one or more pluralities of lights 860, 862 can be configured to emit light having a characteristic that appears like (e.g., matches, mimics, simulates, corresponds to, or otherwise blends with) an environmental condition. Exemplary characteristics of the emitted light can include but are not limited to color and/or intensity (e.g., brightness, etc.). For instance, each of the one or more pluralities of lights 860, 862 can be configured to emit light having a particular color and/or a particular intensity that corresponds to a particular environmental condition.

In certain embodiments, at least two pluralities of lights 860, 862 are used, each of which is configured to emit light that appears like (e.g., matches, mimics, simulates, corresponds to, or otherwise blends with) a different environmental condition. For example, a first plurality of lights 860 can be configured to emit light having a first characteristic (e.g., color and/or intensity) that corresponds to a first environmental condition, and a second plurality of lights 862 can be configured to emit light having a second characteristic (e.g., color and/or intensity) that corresponds to a second environmental condition.

In a particular embodiment, for example, a first plurality of lights 860 can be configured to emit light having a first color, and the second plurality of lights 862 can be configured to emit light having a second color. In another particular embodiment, a first plurality of lights 860 can be configured to emit light having a first intensity, and the second plurality of lights 862 can be configured to emit light having a second intensity. In yet another particular embodiment, each of the one or more pluralities of lights 860, 862 can be configured to emit light having the same color but a different intensity. Additional pluralities of lights 860, 862 can also be used if desired (e.g., a third plurality of lights can be configured to emit light having a third characteristic that corresponds to a third environmental condition).

Various types of lights 860, 862 or lighting elements can also be used, including but not limited to light emitting diodes (LEDs). The one or more pluralities of lights 860, 862 can also be powered in various ways. For example, in some embodiments, the lights 860, 862 are powered using an independent power source (e.g., a battery, a solar power source, a wind power source, etc.). In other embodiments, the lights 860, 862 can derive power from the camouflaged object 810. For example, a transmission line 820 can be configured to supply electrical power to the lights 860, 862 through direct wiring, inductive taps, capacitive taps, etc. A transmission line 820 comprising an optical fiber can also be configured to supply optical power, which can be converted to electrical power for use by the lights 860, 862. Transmission towers can be used to supply electrical power to the lights 860, 862.

The lights 860, 862 can also be configured to be turned "on" or "off." For example, in some embodiments, one or more pluralities of lights 860, 862 can be configured to emit light (i.e., turned "on") based on the presence and/or location of a potential observer relative to the camouflaged object 810. The one or more pluralities of lights 860, 862 can also be configured to turn "off" in the absence of an observer in a particular location relative to the camouflaged object 810.

As previously discussed, the one or more pluralities of lights 860, 862 can be configured to emit light having a characteristic that appears like (e.g., matches, mimics, simulates, corresponds to, or otherwise blends with) a particular environmental condition. In further embodiments, at least one characteristic of the light emitted from the one or more pluralities of lights 860, 862 can also be configured to change based on changes in the environmental condition. For example, at least one characteristic of a first plurality of lights 860 can be configured to change in response to a change in a characteristic of a first environmental condition, and at least one characteristic of a second plurality of lights 862 can be configured to change in response to a change in a characteristic of a second environmental condition. Exemplary changes in environmental conditions include but are not limited to changes associated with ambient lighting conditions and changes associated with time.

Ambient light describes the available light (or surrounding light) in an environment and changes due to a number of factors. For example, ambient lighting conditions can change depending on the time of day (e.g., morning and night) and the time of year (e.g., spring, summer, fall, winter). Ambient lighting conditions can also change due to other factors, including but not limited to the weather (e.g., cloudiness, precipitation (e.g., rain, snow, etc.)). As the ambient lighting conditions change, so can the light emitted from the lights 860, 862. For example, at least one characteristic of the light emitted from one or more pluralities of lights 860, 862 can vary to match, mimic, simulate, correspond to, or otherwise blend with changes in the ambient lighting conditions.

The light emitted from the one or more pluralities of lights 860, 862 can also change based on time, including but not limited to the time of day, time of year, or combinations thereof. For example, one or more pluralities of lights 860, 862 can be configured to emit light having a lower intensity in the morning evening than during the afternoon. As another example, the one or more pluralities of lights 860, 862 can emit light having a first color at one time of the year (e.g., summer) and a second color at a second time of the year (e.g., winter).

The light emitted from the one or more pluralities of lights 860, 862 can also change based on the location of the observer relative to the camouflaged object 810. For example, a characteristic of the emitted light can change as an observer moves from a first location to a second location relative to the camouflaged object 810. In certain embodiments, for example, the one or more pluralities of lights 860, 862 are configured to emit light having a first characteristic when an observer views the camouflaged object 810 from a first location, and a second characteristic when an observer views the camouflaged object 810 from a second location.

Additionally, the light emitted from the one or more pluralities of lights 860, 862 can vary based on movement of the camouflaged object 810. For example, the light emitted from one or more pluralities of lights 860, 862 disposed on a surface of a transmission line 820 can vary with the movement (e.g., swaying, etc.) of the transmission line 820, further reducing the ability of an observer to recognize or otherwise distinguish the transmission line 820 from an environmental condition.

In some embodiments, one or more sensors can also be used, which can be coupled to or otherwise attached to the camouflaged object 810. For example, one or more sensors can be used to detect changes in an environmental condition, including but not limited to changes in the ambient lighting conditions as previously discussed. Sensors can also be used to track and/or detect changes in time. Sensors can also be used to detect the presence and/or location of an observer relative to the camouflaged object 810. The sensors can also be configured to signal or cause a change in the emitted light that corresponds to the detected change or condition.

In further embodiments, sensors can be configured to cause the light emitted from the one or more pluralities lights 860, 862 to continuously match, mimic, simulate, correspond to, or otherwise blend with a particular environmental condition. For example, sensors can be configured to continuously sample (e.g., capture images, detect ambient lighting intensity, etc.) characteristics of an environmental condition. Information processed or derived from the samples can then be used to signal or otherwise cause the light emitted from the one or more pluralities of lights 860, 862 to vary such that it continuously matches, mimics, simulates, corresponds, to, or otherwise blends with the environmental condition, independent of changes thereto.

Exemplary sensors that can be used include but are not limited to cameras, radars, clocks, photometers, and RF receivers. For example, cameras can be used to sample (e.g., capture images of an environmental condition and/or an observer) and/or detect the presence and/or location of an observer. Radars and RF receivers can also be used to detect the presence and/or location of an observer, e.g., based on emissions from an observer's cell phone. Clocks can be used to track and signal changes in time. Photometers can be used to monitor ambient lighting conditions. Other types of sensors can also be used.

With continued reference to FIGS. 9A-9C, the one or more pluralities of lights 860, 862 can be disposed on the camouflaged object 810 at various locations, including but not limited to a first side, a second side, a top side, a bottom side, or any combination thereof. In the illustrated embodiment of FIG. 9A, for instance, a first plurality of lights 860 is disposed on a first surface 822 and a second plurality of lights 862 is disposed on a second surface 824, which are on opposite sides of the transmission line 820. In other embodiments, the first and second surfaces 822, 824 on which the one or more pluralities of lights 860, 862 are disposed can be on adjacent sides of the transmission line 820. One or more pluralities of lights 860, 862 can be disposed at a first azimuthal surface and one or more pluralities of lights 860, 862 can be disposed at a second azimuthal surface of the transmission line 820.

Each of the pluralities of lights 860, 862 can also be arranged or operated on the camouflaged object 810 in various ways. For example, the one or more pluralities of lights 860, 862 can be configured to operate on at least a portion of the camouflaged object 810 in a non-linear pattern so as to cause at least the portion of the camouflaged object 810 to appear non-linear and reduce an ability to recognize the camouflaged object 810. Operating the lights 860, 862 in a non-linear pattern can include disposing the lights 860, 862 in a non-linear pattern (e.g., non-linear spatial pattern), and configuring the lights 860, 862 to emit light in a non-linear pattern (e.g., non-linear spatial pattern), and combinations thereof.

For example, as shown in FIG. 9B, in some embodiments, operating the lights 860 in a non-linear pattern comprises placement of one or more pluralities of lights 860 in a non-linear pattern on a surface 822 of the camouflaged object 810. Exemplary non-linear patterns can include but are not limited to staggered patterns, offset patterns, curved patterns (e.g., curved line), irregular two-dimensional distribution patterns, irregular three-dimensional distribution patterns, and combinations thereof. In other embodiments, the lights 862 can be disposed in a linear pattern, as shown in FIG. 9C.

Operating the lights 860, 862 in a non-linear pattern can also comprise configuring the lights 860, 862 to emit light in a non-linear pattern, independent of whether the lights 860, 862 are disposed on a surface 822 in a non-linear pattern or a linear pattern. In such embodiments, operation of the lights 860, 862 can comprise varying a characteristic of the lights 860, 862 in a non-linear spatial pattern. Exemplary non-linear spatial patterns include but are not limited to staggered patterns, offset patterns, curved patterns (e.g., curved line), irregular two-dimensional distribution patterns, irregular three-dimensional distribution patterns, and combinations thereof. Exemplary characteristics of the emitted light include but are not limited to color, intensity, and time dependence of light emission. For example, individual lights 860, 862 within a plurality can emit different colors, intensities, and/or be turned "on" or "off" (time dependence) to reduce the ability of an observer to recognize the camouflaged object 810.

Operating a one or more pluralities of lights 860, 862 in a non-linear pattern can be particular advantageous when the surface 822 of the camouflaged object 810 is substantially linear. For example, operating one or more pluralities of lights 860, 862 in a non-linear pattern can cause a substantially linear surface 822 to appear non-linear (e.g., like the substantially linear surface 822 of the transmission line 820 in the illustrated embodiment), further aiding in reducing the ability of an observer to recognize the camouflaged object 810.

One or more pluralities of lights 860, 862 can also be disposed on a surface that extends along a direction (e.g., a longitudinal direction) and can further emit light including one or more additional characteristics that correspond to one or more additional environmental conditions. In such embodiments, the light emitted from the one or more pluralities of lights 860, 862 can change along the first direction so as to correspond to changes between the environmental conditions. For example, a first portion of a first plurality of lights 860, 862 being configured to emit light having a first characteristic that corresponds to a first environmental condition can be disposed on a first portion of a first surface, and a second portion of the first plurality of lights 860, 862 being configured to emit light having a second characteristic that corresponds to a second environmental condition can be disposed on a second portion of the first surface.

Additionally, if desired, one or more pluralities of lights 860, 862 can also be configured to enhance visualization of the camouflaged object 810. For example, one or more pluralities of lights 860, 862 can be disposed on a surface (e.g., a top surface) and be configured to emit light that is easily seen or otherwise recognizable by a human such as a pilot of an airplane, helicopter, para glider, hang glider, or other form of aircraft, or by animals such as birds.

As can be appreciated, the one or more pluralities of lights 860, 862 can be disposed on the camouflaged object 810 at any time, including but not limited to during the manufacturing process, after the manufacturing process but prior to delivery, after delivery during installation, and after installation. Further, robots can be used to dispose the one or more pluralities of lights 860, 862 onto the camouflaged object 810. For example, line walking robots can be used in embodiments where the camouflaged object 810 comprises a transmission line 820.

The spacing between the individual lights within the plurality of lights 860, 862 can also vary as desired. For example, the spacing between the individual lights can be such that an observer cannot distinguish between the individual lights when observing the camouflaged object 810 from a particular location (e.g., a location at which observers are anticipated to observe the camouflaged object 810). The one or more pluralities of lights 860, 862 can also be disposed on a reflector, such as the reflector discussed above in reference to FIGS. 3A-3B.

FIGS. 10A-10B depict a camouflaged object 910 comprising a transmission tower 930, according to another embodiment of the disclosure. As shown in FIGS. 10A-10B, one or more pluralities of lights 960, 962 can be disposed on a transmission tower 930, which can comprise a pylon or pillar-like structure 937. For example, a first plurality of lights 960 can be disposed on a first surface 932, and a second plurality of lights 962 can be disposed on a second surface 934. As shown in FIGS. 10A-10B, the first surface 932 can be on a first side of the transmission tower 930, and the second surface 934 can be on a second side of the transmission tower 930.

Further, as shown in FIG. 10A, in some embodiments, one or more pluralities of lights 960 can be disposed on the transmission tower 930 in a staggered, offset, or non-linear pattern. In other embodiments, one or more pluralities of lights 962 can be disposed in a substantially linear pattern, as shown in FIG. 10B. As previously discussed, one or more pluralities of lights 960, 962 can also be configured to emit light in a non-linear pattern, independent of how the lights 960, 962 are disposed on the transmission tower 930.

Figure 11:
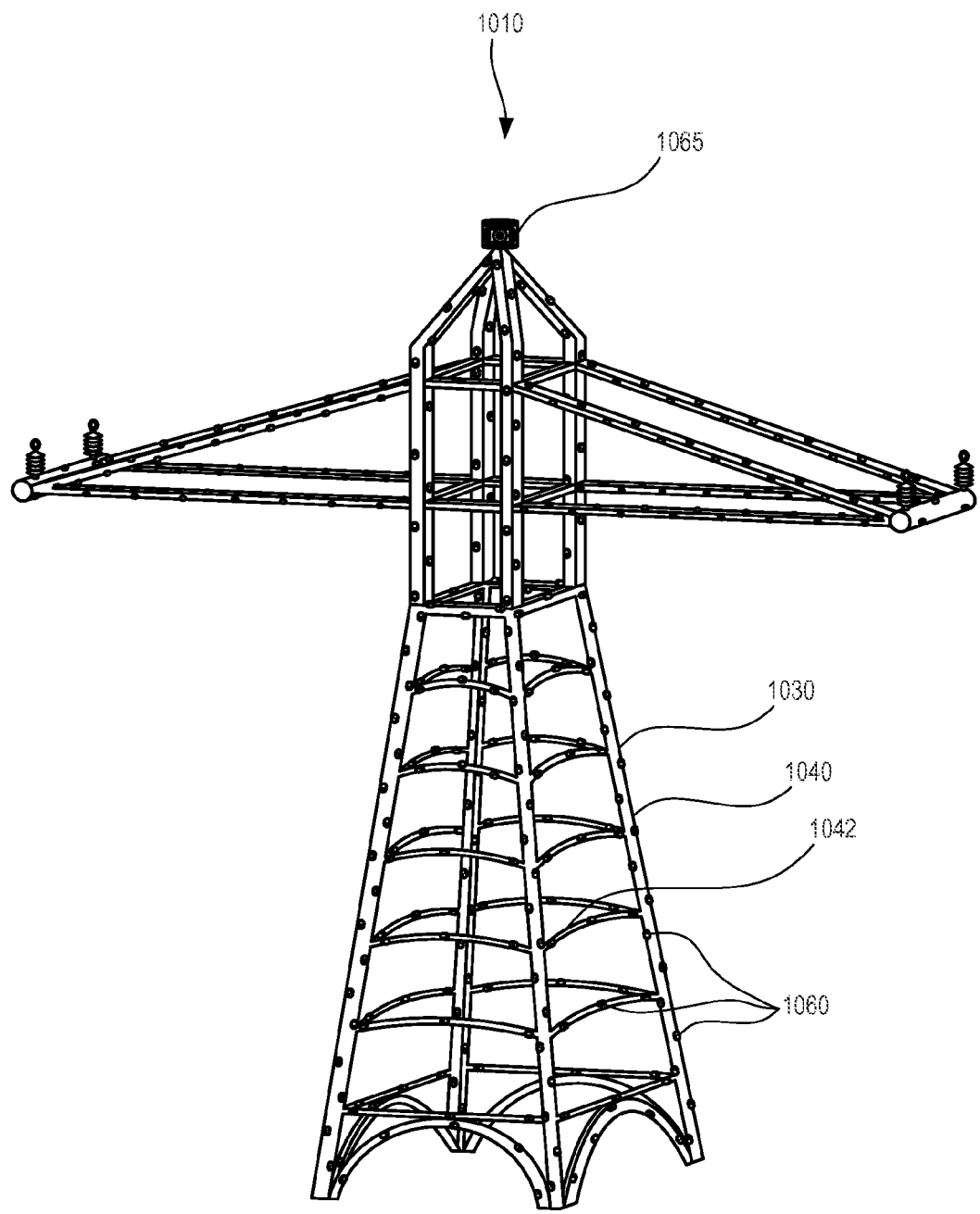
FIG. 11 depicts a camouflaged object comprising a transmission tower, according to another embodiment of the present disclosure.

FIG. 11 depicts a camouflaged object 1010 comprising a transmission tower 1030, according to another embodiment of the disclosure. As shown in FIG. 11, the transmission tower 1030 comprises a lattice structure 1040 having a plurality of struts 1042. As further shown in FIG. 11, in some embodiments, one or more pluralities of lights 1060 can be disposed on one or more surfaces of the lattice structure 1040 and/or the struts 1042 thereof.

A sensor 1065 is also shown coupled to the transmission tower 1030. As previously discussed, various types of sensors 1065 can be used. Sensors 1065 can also be used for many reasons, including but not limited to detecting changes in ambient lighting conditions and detecting the presence or location of an observer.

FIGS. 12A-12B depict a camouflaged object 1110 comprising a transmission tower 1130, according to another embodiment of the disclosure. As shown in FIGS. 12A-12B, in some embodiments, the transmission tower 1130 comprises a lattice structure 1140 having a plurality of struts 1142. Further, in the illustrated embodiment, one or more struts 1142 are non-linear, which can aid in reducing the ability of an observer to recognize the camouflaged object 1110 (e.g., non-linear shapes can be more difficult for an observer to recognize as compared to linear shapes). In other embodiments, the struts 1142 can be substantially linear. Independent of whether the struts 1142 are substantially linear or non-linear, the lights 1160, 1162 can be operated to emit light in a non-linear pattern, as previously discussed.

As further shown in FIGS. 12A-12B, one or more pluralities of lights 1160, 1162 can be disposed on one or more surfaces 1144, 1146 of the lattice structure 1140 and/or the struts 1142 of the transmission tower 1130. For example, in the illustrated embodiment, a first plurality of lights 1160 is disposed on a first surface 1144 of the lattice structure 1140, and a second plurality of lights 1162 is disposed on a second surface 1146 of the lattice structure 1140. When viewed from a first location, as shown in FIG. 12A, light emitted from the first plurality of lights 1160 disposed on the first surface 1144 can cause the first surface 1144 to appear like (match, mimic, simulate, correspond to, or otherwise blend with) a first environmental condition. Analogously, when viewed from a second location, as shown in FIG. 12B, light emitted from the second plurality of lights 1162 disposed on the second surface 1146 can cause the second surface 1146 to appear like (match, mimic, simulate, correspond to, or otherwise blend with) a second environmental condition.

Methods for camouflaging an object are also provided herein. In particular, it is contemplated that any of the components, principles, and/or embodiments discussed above may be utilized by either a system or a method. For example, in an embodiment, a method for camouflaging an object can comprise operating a first plurality of lights on a first surface of an object, the first plurality of lights being configured to emit light having a first characteristic that corresponds to a first environmental condition, and operating a second plurality of lights on a second surface of the object, the second plurality of lights being configured to emit light having a second characteristic that corresponds to a second environmental condition. The method can further comprise a step of initiating light emission from at least one of the pluralities of lights. Additional steps, and/or methods, can also be employed.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A camouflaged transmission system, comprising:
   at least one camouflaged object comprising at least one of a transmission line and a transmission tower;
   a first plurality of lights that are configured to emit light having a first characteristic that corresponds to a first environmental condition, wherein the first plurality of lights is configured to emit light based on the presence of an observer and turn off in the absence of the observer; and
   a second plurality of lights that are configured to emit light having a second characteristic that corresponds to a second environmental condition, wherein the first environmental condition differs from the second environmental condition.

2. The system of claim 1, wherein the camouflaged object comprises a transmission line.

3. The system of claim 1, wherein the camouflaged object comprises a transmission tower.

4. The system of claim 1, wherein the first environmental condition comprises the camouflaged object's surroundings when the camouflaged object is viewed from a first location, and the second environmental condition comprises the camouflaged object's surroundings when the camouflaged object is viewed from a second location.

5. The system of claim 1, wherein the first environmental condition comprises a first background environmental landscape when the camouflaged object is viewed from a first location, and the second environmental condition comprises a second background environmental landscape when the camouflaged object is viewed from a second location.

6. The system of claim 5, wherein each of the first and second background environmental landscapes comprises at least one of the following: a forested landscape, a wooded landscape, a mountainous landscape, a coastal landscape, a rocky landscape, a snowy landscape, a hilly landscape, a desert landscape, a plain landscape, an agricultural landscape, a sky landscape, a water landscape, a grassy landscape, an industrial landscape, a commercial landscape, and a residential landscape.

7. The system of claim 1, wherein the first characteristic comprises at least one of a color or intensity, and the second characteristic comprises at least one of a color or intensity.

8. The system of claim 1, wherein each of the first and second pluralities of lights comprises light emitting diodes.

9. The system of claim 1, further comprising a sensor to determine at least one of the presence and the location of the observer of the object.

10. The system of claim 9, wherein the sensor comprises at least one of a camera, a radar, and an RF receiver.

11. The system of claim 9, wherein the first plurality of lights is configured to emit light based on the location of the observer relative to the object.

12. The system of claim 1, wherein the first plurality of lights is configured to vary light emission based on an ambient light condition.

13. The system of claim 1, wherein the first plurality of lights is configured to vary light emission based on time.

14. The system of claim 1, wherein at least one of the first plurality of lights and the second plurality of lights are disposed in a non-linear pattern.

15. The system of claim 1, wherein at least one of the first plurality of lights and the second plurality of lights is disposed in a non-linear pattern on a linear surface of the camouflaged object so as to cause the linear surface of the camouflaged object to appear non-linear and reduce an ability to recognize the camouflaged object.

16. The system of claim 1, wherein the first characteristic is configured to change in response to a change in a characteristic of the first environmental condition, and the second characteristic is configured to change in response to a change in a characteristic of the second environmental condition.

17. The system of claim 16, further comprising a sensor that is configured to detect a change in at least one of the first environmental condition and the second environmental condition.

18. The system of claim 17, wherein the sensor comprises at least one of a camera, a clock, a radar, and a photometer.

19. The system of claim 17, wherein the sensor is configured to cause a change in at least one of the first characteristic and the second characteristic that corresponds to the change detected in the at least one of the first environmental condition and the second environmental condition.

20. A camouflaged transmission system, comprising:
   at least one camouflaged object comprising at least one of a transmission line and a transmission tower; and
   a first plurality of lights that are configured to emit light having a first characteristic that corresponds to a first environmental condition, wherein the first plurality of lights are operated on at least a portion of the camouflaged object in a non-linear pattern so as to cause at least the portion of the camouflaged object to appear non-linear and reduce an ability to recognize the camouflaged object, wherein the first plurality of lights is configured to emit light based on the presence of an observer and turn off in the absence of the observer.

21. A method for camouflaging an object, the object comprising at least one of a transmission line and a transmission tower, comprising:

operating a first plurality of lights on a first surface of the object, the first plurality of lights being configured to emit light having a first characteristic that corresponds to a first environmental condition, wherein the first plurality of lights is configured to emit light based on the presence of an observer and turn off in the absence of the observer; and operating a second plurality of lights on a second surface of the object, the second plurality of lights being configured to emit light having a second characteristic that corresponds to a second environmental condition, wherein the first environmental condition differs from the second environmental condition.

22. The method of claim 21, further comprising initiating light emission from at least one of the lights.

23. The method of claim 21, wherein the object comprises a transmission line.

24. The method of claim 21, wherein the object comprises a transmission tower.

25. The method of claim 21, wherein the first environmental condition comprises the object's surroundings when the object is viewed from a first location, and the second environmental condition comprises the object's surroundings when the object is viewed from a second location.

26. The method of claim 21, wherein the first environmental condition comprises a first background environmental landscape when the object is viewed from a first location, and the second environmental condition comprises a second background environmental landscape when the object is viewed from a second location.

27. The method of claim 26, wherein each of the first and second background environmental landscapes comprises at least one of the following: a forested landscape, a wooded landscape, a mountainous landscape, a coastal landscape, a rocky landscape, a snowy landscape, a hilly landscape, a desert landscape, a plain landscape, an agricultural landscape, a sky landscape, a water landscape, a grassy landscape, an industrial landscape, a commercial landscape, and a residential landscape.

28. The method of claim 21, wherein the first characteristic comprises at least one of a color or intensity, and the second characteristic comprises at least one of a color or intensity.

29. The method of claim 21, wherein each of the first and second pluralities of lights comprises light emitting diodes.

30. The method of claim 21, further comprising a sensor to determine at least one of the presence and the location of the observer of the object.

31. The method of claim 30, further comprising varying light emission from at least one of the lights in response to data from the sensor.

32. The method of claim 30, wherein the sensor comprises at least one of a camera, a radar, and an RF receiver.

33. The method of claim 30, wherein the first plurality of lights is configured to emit light based on the location of the observer relative to the object.

34. The method of claim 21, wherein the first plurality of lights is configured to vary light emission based on an ambient light condition.

35. The method of claim 21, wherein the first plurality of lights is configured to vary light emission based on time.

36. The method of claim 21, wherein the first plurality of lights are disposed on the first surface in a non-linear pattern, and the second plurality of lights are disposed on the second surface in a non-linear pattern.

37. The method of claim 36, wherein at least one of the first plurality of lights and the second plurality of lights is disposed in a non-linear pattern on a linear surface of the object so as to cause the linear surface of the object to appear non-linear and reduce an ability to recognize the object.

38. The method of claim 21, wherein the first characteristic is configured to change in response to a change in a characteristic of the first environmental condition, and the second characteristic is configured to change in response to a change in a characteristic of the second environmental condition.

39. The method of claim 38, wherein a sensor is coupled to the object, the sensor being configured to detect a change in at least one of the first environmental condition and the second environmental condition.

40. The method of claim 39, wherein the sensor comprises at least one of a camera, a clock, a radar, and a photometer.

* * * * *